United States Patent [19]

Lester et al.

[11] Patent Number: 5,289,534
[45] Date of Patent: Feb. 22, 1994

[54] DOOR AJAR SIGNALLING DEVICE

[75] Inventors: James W. Lester, Ventura; Randall M. Wagner, Thousand Oaks; Randy A. Callaway, Simi Valley; Michael Kennedy, Ventura, all of Calif.

[73] Assignee: Harris Corporation

[21] Appl. No.: 795,374

[22] Filed: Nov. 21, 1991

[51] Int. Cl.$^5$ .................. H04M 11/00; H04M 11/04; G08B 1/00; G08B 13/08
[52] U.S. Cl. .................................. 379/103; 379/102; 379/39; 379/40; 340/531; 340/545
[58] Field of Search ............... 379/102, 103, 104, 105, 379/106, 54, 37, 38, 39, 40, 41, 42, 43, 44, 45, 46, 47, 48, 49, 50, 51, 52, 53; 340/531, 545

[56] References Cited

U.S. PATENT DOCUMENTS

| | | | |
|---|---|---|---|
| 4,521,645 | 6/1985 | Carroll | 379/42 |
| 4,760,593 | 7/1988 | Shapiro et al. | 379/38 |
| 4,764,953 | 8/1988 | Chern et al. | 379/103 |
| 4,920,333 | 4/1990 | Barr et al. | 340/545 |
| 4,943,997 | 7/1990 | Chang | 379/103 |
| 5,140,308 | 8/1992 | Tanaka | 379/44 |

Primary Examiner—Jin F. Ng
Assistant Examiner—Jason Chan
Attorney, Agent, or Firm—Evenson, McKeown, Edwards & Lenahan

[57] ABSTRACT

A door phone controller has a door ajar feature for alerting a user that a door was left open. The door phone controller accommodates the door ajar feature in several different ways depending upon how it is configured to interface with the central office line. If the door phone controller is configured to interface with the central office line as an individual station, then when a door is left open, the controller alerts the user via auxiliary alert contacts specifically provided for activating a customer chime. When the door phone controller is configured as a ring-down station, the door phone controller alerts the user that the door was left ajar by dialing a pre-programmed telephone number and sending a door ajar tone. If the door phone controller is configured as an interface with a trunk port, then when the door is left open, the controller alerts the user by ringing the trunk line and also energizing the auxiliary alert contacts. The user can both enable and disable the door ajar features via the telephone interface.

17 Claims, 5 Drawing Sheets

DOOR AJAR SIGNALLING DEVICE

FIELD OF THE INVENTION

This invention relates to a door phone controller for use with a host telephone system and, more particularly, to a door phone controller which alerts a user through the host telephone system when a transmitting device indicates that a connection has been broken such as when an entrance door is ajar. The transmitting device can be, for example, a magnetic switch which breaks its connection when the door is opened and regains its connection when the door is closed.

BACKGROUND OF THE INVENTION

Door phone controllers have been used to allow host telephone equipment to function as both an ordinary telephone for placing outside or central of f ice line telephone calls and to operate a security door, such as an apartment building entrance door, by providing a paging/intercom system with a speaker located by the security door. The door phone controller allows the person inside the building to open the door via a door-unlock push-button or through dual tone multi-frequency (DTMF) signalling via the host telephone's keypad. Either of these actions, i.e. pressing the door-unlock push-button or dialing the DTMF code, closes metallic contacts which then activate the customer-provided electric door release or latch.

Known systems provide a latch driving device, the primary purpose of which is to activate an electric door strike plate when the proper DTMF code is detected. The electric door strike plate remains active for an adjustable period of time, for example 1-15 seconds, thus allowing the door to be opened. A reset switch, e.g. a "Reed" relay, is provided to de-activate the latch after the door is opened, regardless of the adjustable activation setting. However, this latch driving device does not provide the user with any indication as to whether the door has been left ajar.

Another known system which is computer based provides a door ajar signal to the user by either displaying which door is ajar on a cathode ray tube (CRT) or by activating metallic contacts which in turn activate a customer-provided alerting device. However, this door ajar system provides no variability with respect to its operation and thus is not adaptable to the individual user's needs.

There is therefore needed a system and method for alerting a user through the host telephone system when an entrance door has been left ajar or, has ever been opened. Such a system should be adaptable to the individual needs of the user and be simple to operate.

SUMMARY OF THE INVENTION

These needs are met by the present invention which provides a door phone controller having a door ajar feature for alerting the user that a door was left open. The door phone controller can accommodate the door ajar feature in several different ways depending upon how it is configured to interface with the central of f ice line. For example, if the door phone controller is configured to interface with the private branch exchange (PBX) line as an individual station, then when a door is left open the controller alerts the user via auxiliary alert contacts specifically provided for activating a customer chime. When the door phone controller is configured as a "ring-down station", i.e. the door phone controller dials a pre-programmed number to alert the user through the host telephone system, the door phone controller alerts the user that the door was left ajar by dialing a pre-programmed telephone number and sending a door ajar tone. Finally, if the door phone controller is configured as an interface with a trunk port, then when the door is left open, the controller alerts the user by "ringing" the trunk line (if the host telephone system is on-hook) and also energizing the auxiliary alert contacts. However, if a central office telephone call is in progress when the door is ajar, the door phone controller alerts the user by sending a "door-waiting" tone to the user. The user then has the option of either hanging up the telephone call which passes the door waiting call through to the telephone or the user can send a "hook flash" signal to the door phone controller. If a "hook flash" signal is sent, the central off ice call is placed on hold via the controller and the user is switched to the door circuit in which case the user will receive the door ajar tone.

The invention has the advantage of allowing the user to both enable and disable the door ajar features via the telephone interface. In order to configure the options available to the user, the user first gains access to the door phone controller. Once access is completed, the user is required to enter the programming mode for the door phone controller by inputting a keypad selection, for example, ##3. Once the programming mode is accessed, the door phone controller can be configured in several ways. By enabling and disabling the door ajar features via the telephone interface, the user is provided with various options for configuring the system to suit his needs.

Other objects, advantages and novel features of the present invention will become apparent from the following detailed description of the invention when considered in conjunction with the accompanying drawings.

DETAILED DESCRIPTION OF THE DRAWINGS

Figure 1:
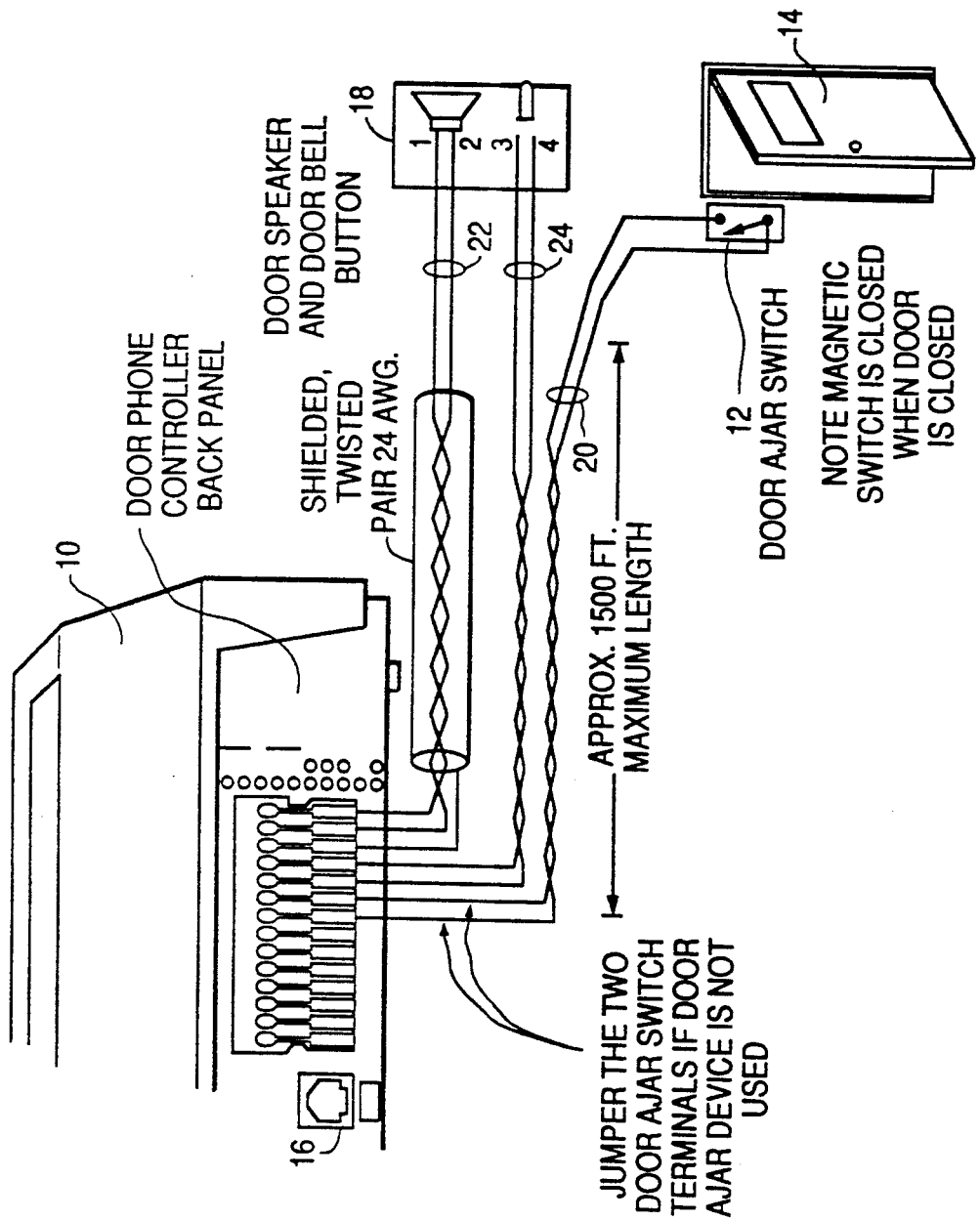
FIG. 1 is a schematic block diagram indicating the connections for the door speaker/button and door ajar device with the door phone controller.

Referring to FIG. 1, a schematic block diagram is shown indicating the connections between the back panel of a door phone controller 10 and a door speaker/doorbell button 18 and a door 14. A door ajar switch 12 is operatively arranged in conjunction with the door 14. The door ajar switch 12 is most often a magnetic relay of the "REED" type that has its connection broken when the door 14 is opened (as shown in FIG. 1) and regains its connection when the door 14 is closed. Conductors 20 couple the door ajar switch 12 to the door ajar switch terminals located on the back panel of the door phone controller 10. Similarly, the door speaker and doorbell button 18 are coupled via conductors 22 and 24, respectively, to the back panel of the door phone controller 10. The back panel of the door phone controller 10 also includes a modular outlet plug 16 for coupling to the host telephone system equipment.

Figure 5:
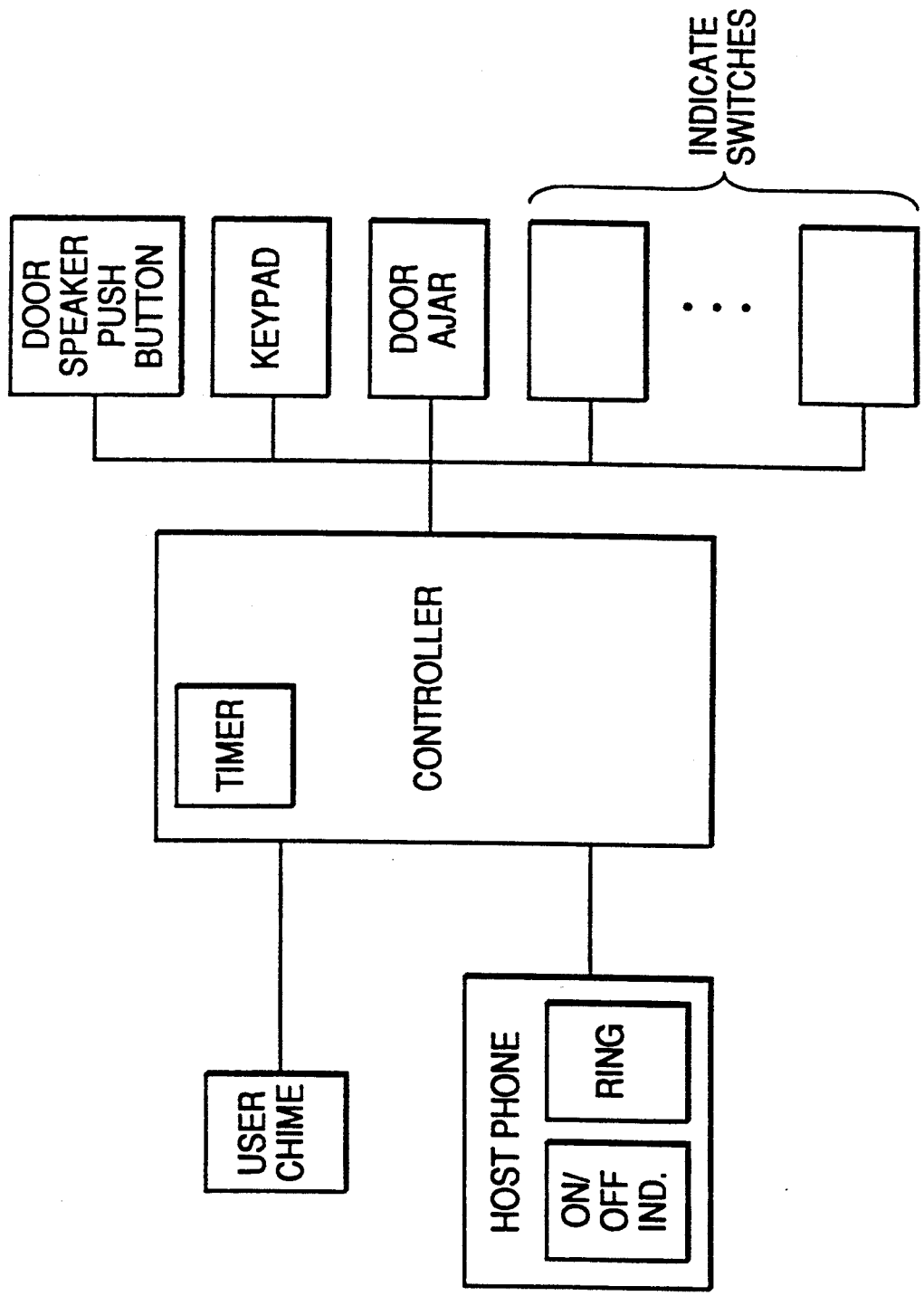
FIG. 5 is a schematic block diagram of the system according to the present invention.

FIG. 5 is a schematic block diagram showing the controller coupled to the various features forming the present invention, as will be discussed below.

The general operation of the door phone controller 10 will now be described briefly and the specific operation of the door ajar feature will be described in greater detail below.

In the event that the door speaker push-button 18 is pressed, i.e. activated, the door phone controller 10 generates a ring signal via the modular coupling 16 to the host telephone equipment. Alternatively, the door phone controller 10 may dial a pre-programmed extension and/or energize auxiliary alert contacts for activating a dedicated customer chime. Whenever a person inside the building hears the host telephone ring and/or the chime sound, the user can respond by answering the ringing phone thus causing the host telephone to go "off-hook". When the host telephone goes off-hook, loop current is drawn from the door phone controller which establishes a two-way, page/talk-back path with the door speaker 18. In order to open the door, the person inside the building either enters a specific door code on the host telephone's keypad or activates a customer-provided door-unlock push-button. Either of these actions will close metallic contacts that activate a customer-provided electric door release, thus allowing the person at the door to open it. However, if the door ajar feature of the door phone controller 10 is active and the metallic contacts are opened and closed, then the door ajar device acts as a reset switch which de-activates the electric door release latch after the door is opened. In this manner, even though the electric door release latch is pre-programmed to be active for a specific time period, the door ajar feature functions to de-activate the electric door release latch once the door is opened.

Alternatively, whenever the telephone rings or the chime sounds, the person inside the building can press the customer-provided door-unlock push-button without taking the host telephone off-hook. Pressing the button in this instance has the effect of stopping the ringing and/or chiming and opening the door. This allows the door to be unlatched without the use of the host telephone.

The door ajar mechanism of the door phone controller alerts the user that a door has been left open as shown in FIG. 1. The manner of alerting the user can be accomplished in several ways depending upon how the door phone controller 10 is configured to interface with the host telephone system for handling outside telephone calls. For example, if the door phone controller is configured to interface as a station, then if the door is left open the controller alerts the user via the auxiliary alert contacts. If the door phone controller 10 is configured as a ring-down station, the controller alerts the user by dialing a pre-programmed telephone number to alert the user that the door was left open. Finally, if the door phone controller is configured to interface as a trunk line, then if the door is left open, the controller alerts the user by "ringing" the trunk (if the host telephone is on-hook) and energizing the auxiliary alert contacts. However, if a central office line telephone call is in progress and the door becomes ajar, the door phone controller alerts the user by sending a door-waiting tone to the user. The user may then either hang up the telephone and the door waiting call will be passed through to the telephone or the user can send a "hook flash" signal to the door phone controller. If a "hook flash" signal is sent, the central office telephone call is placed on hold by the controller and the user will be switched through to the door circuitry and the user will receive the door ajar tone.

The door ajar mechanism of the door phone controller is enabled and disabled via the telephone interface. In order to configure the door ajar options, the user must first gain access to the door phone controller. Once access is accomplished, the user enters a programming mode for the door phone controller by dialing a predetermined number, for example ##3. Once the programming mode is entered, the door phone controller can be configured to either disable the door ajar feature or operate the door ajar feature in one of the following modes.

Figure 2:
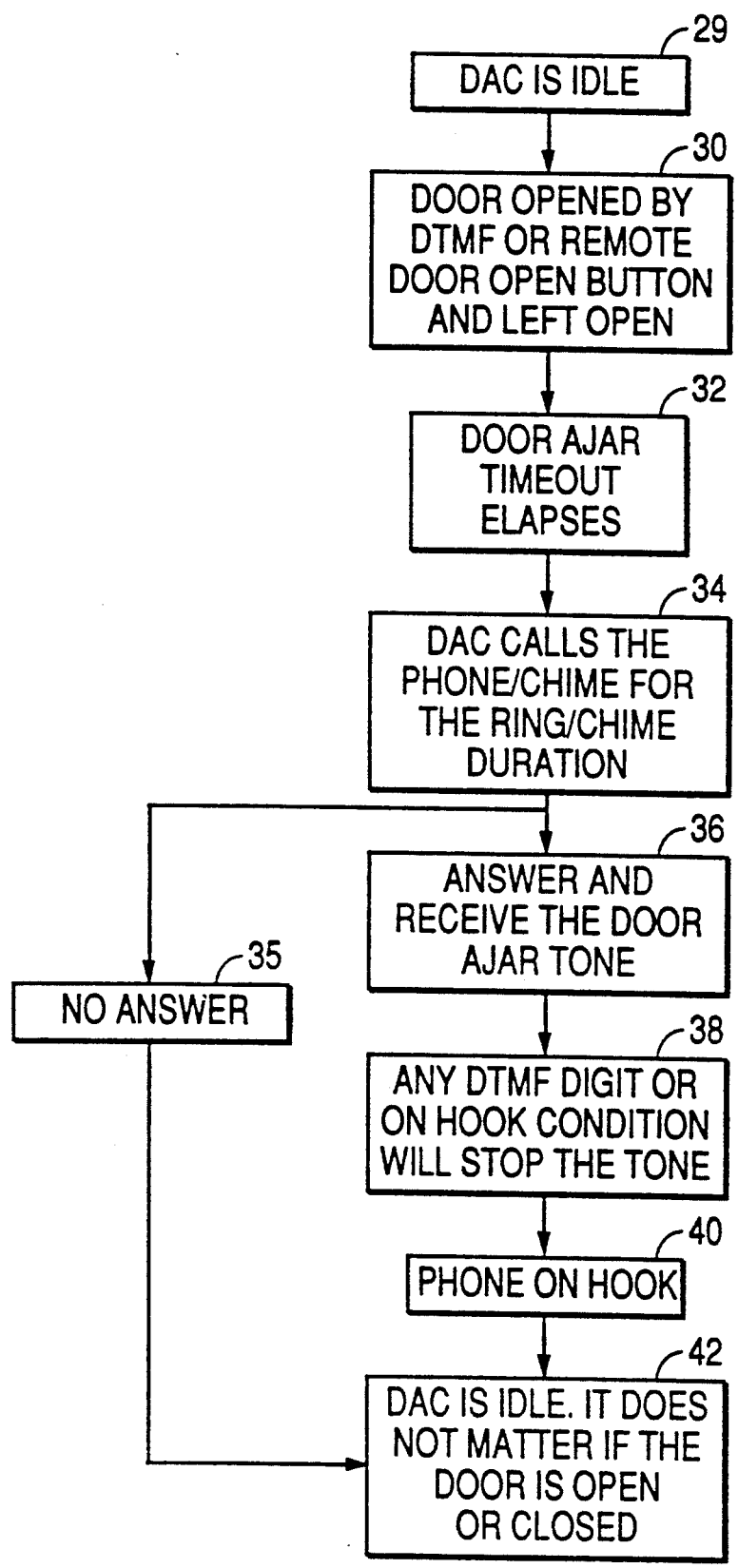
FIG. 2 is a state diagram for a first mode of operation of the door ajar feature for the door phone controller.

Referring to FIG. 2, a state diagram is shown for a first mode of operation of the door ajar mechanism. In this mode of operation, the door phone controller begins in an idle state (step 29). The electric door release latch is first opened either by the remote door open button or the DTMF signaling (step 30). This allows the person outside the building to open the door and enter. Assuming the door is then left open, a door ajar time-out will then elapse (step 32). At this step, if the door is still open, the door phone controller will call back the host telephone/customer-provided chime for the duration of a ring/chime setting period (step 34). The ring/chime setting time period is programmed into the system and is the length of time which the host telephone and/or customer-provided chime will sound when the door speaker push-button is activated by someone outside of the building.

If the host telephone is not answered (step 35) by the person inside the building during the ring/chime time setting period, then the door phone controller returns to its idle state (step 42). However, if the host telephone is answered by the person inside the building during the ring/chime time setting period, then the door phone controller provides the door ajar tone to the host telephone (step 36). The door ajar tone ceases when any keypad digit is pressed (step 38) or when the host telephone is again placed on-hook (step 40).

In this mode of operation, the door ajar tone can be terminated without requiring that the door be closed. The controller then remains idle (step 42).

Figure 3:
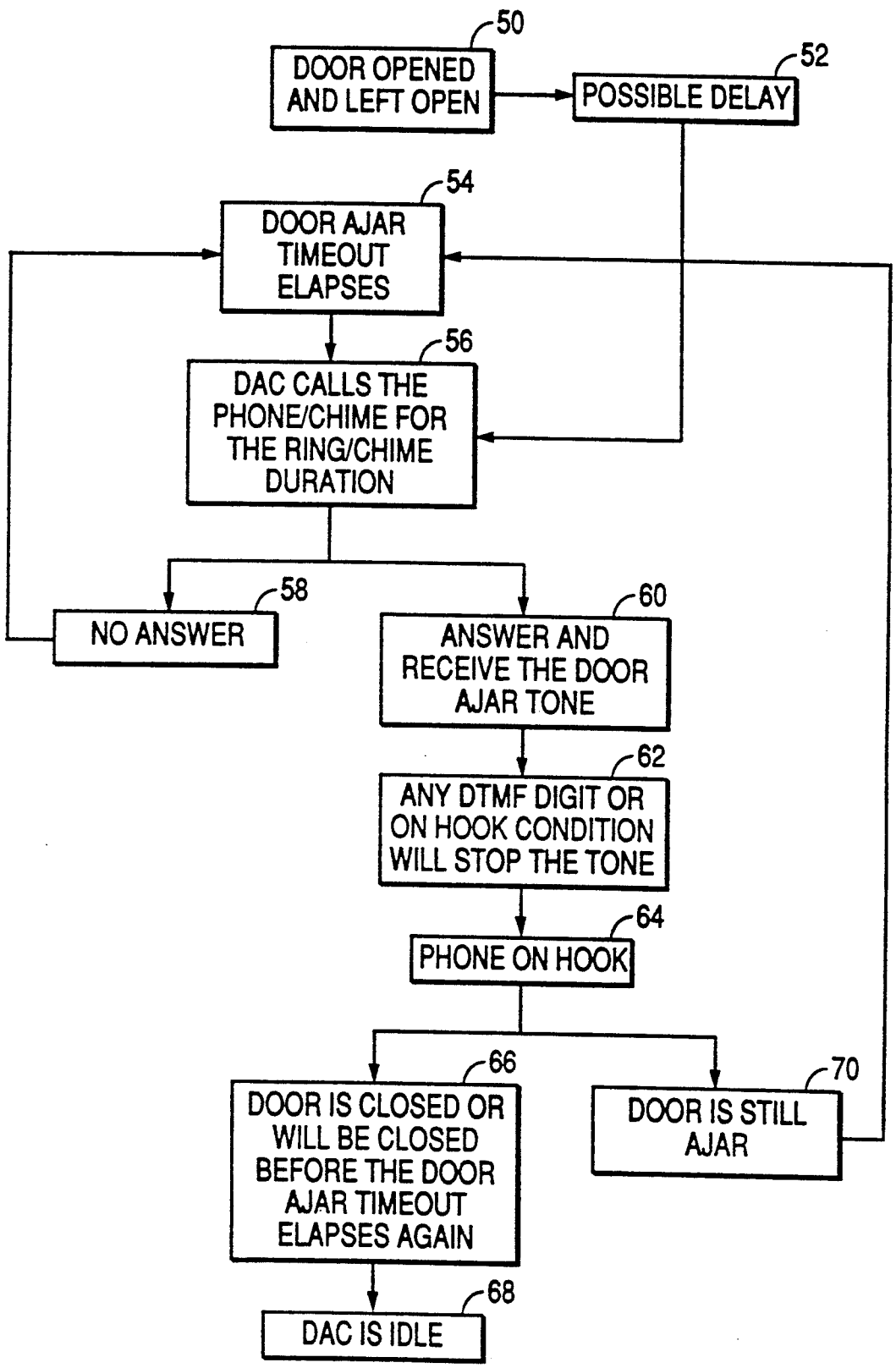
FIG. 3 is a state diagram for a second mode of operation of the door ajar feature for the door phone controller.

Referring to FIG. 3, a second mode of operation is shown for the door ajar mechanism. In this mode, if the door is opened and remains open (step 50) then the door phone controller will call back the host telephone/chime for the duration of the ring/chime setting (step 56). It should be noted that a possible delay (step 52) may be encountered if the door phone controller detects an off-hook/on-hook transition. Such a transition causes the door ajar time-out to be present until the time-out expires. Once the door ajar time-out again elapses (step 54), the door phone controller again calls the host telephone/chime for the ring/chime duration (step 56). If there is no answer (step 58) then the sequence repeats itself after the door ajar time-out again elapses (step 54).

If the person inside the building answers the host telephone, in which case the host phone goes off-hook, then the door ajar tone will be received at the host telephone (step 60). The door ajar tone will then cease once any DTMF digit is pressed or the host telephone is placed on-hook (steps 62 and 64). If the door remains ajar (step 70) even after the host telephone is again placed on-hook (step 64), then the sequence will repeat itself after the door ajar time-out again elapses (step 54).

However, if the door is closed or will be closed prior to the door ajar time-out again elapsing (step 66), then the door phone controller will revert to its idle state (step 68).

Figure 4:
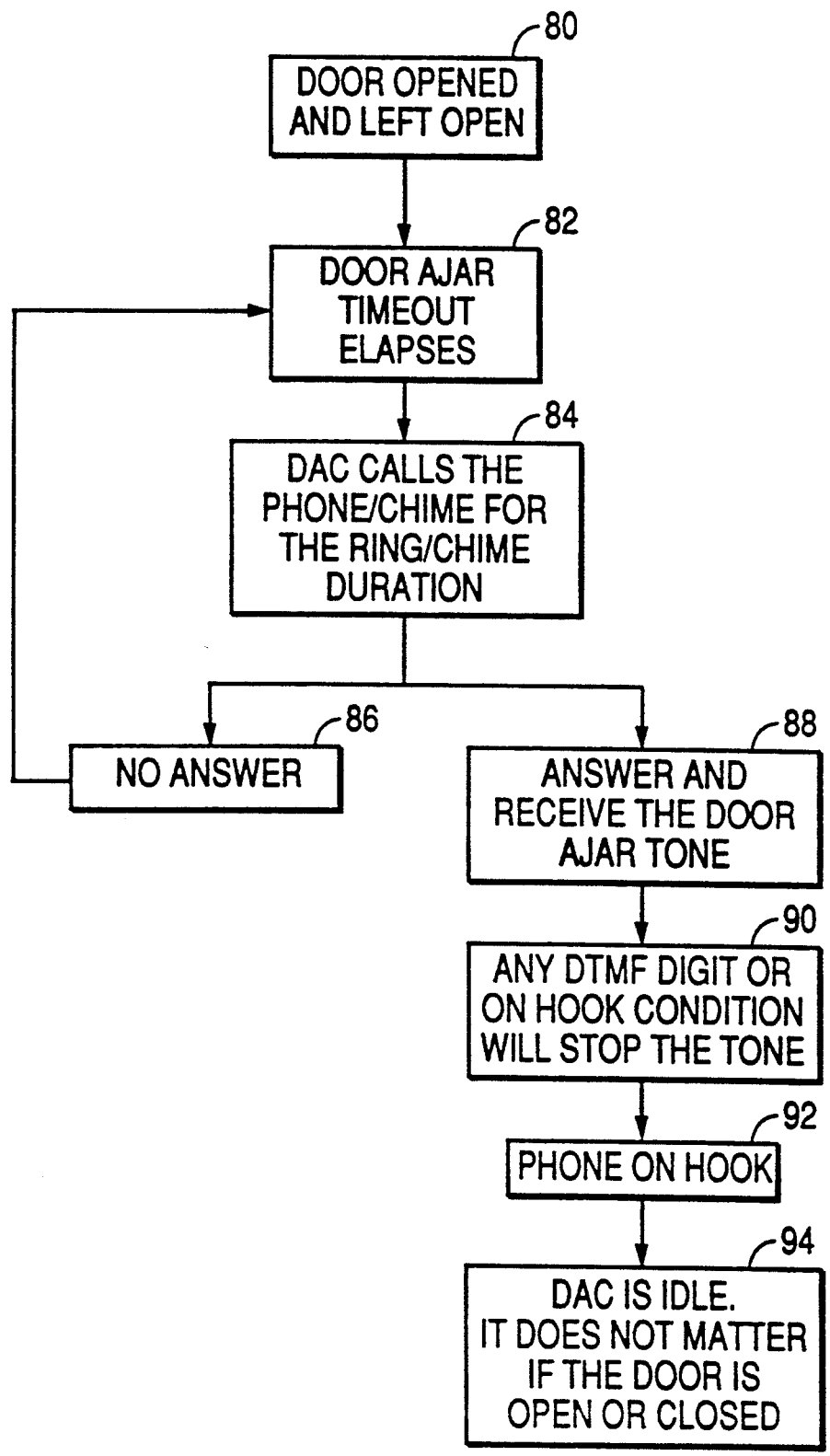
FIG. 4 is a state diagram for a third mode of operation of the door ajar feature for the door phone controller.

Referring to FIG. 4, the state diagram for a third mode of operation of the door ajar mechanism is described. Once a door is opened and remains open (step 80), then the door ajar timer is activated. If the door ajar time-out elapses (step 82), then the door phone controller calls the host telephone/chime for the ring/chime time setting duration as described with respect to FIGS. 2 and 3 (step 84). If the person inside the building does not answer (step 86), then the door ajar time-out again elapses (step 82) and the sequence is repeated.

However, if the host telephone is answered within the ring/chime time setting duration, then the door ajar tone is received (step 88). The door ajar tone will cease sounding once any DTMF digit is pressed or an on-hook condition occurs (steps 90 and 92). After the host telephone goes on-hook, the door phone controller remains idle (step 94). In this mode of operation, the door ajar tone will not be repeated even if the door remains open. A contact closure, from the door ajar sensor (switch 12 in FIG. 1), is used to indicate that the door has been closed which would re-activate the door ajar alerting function.

Other embodiments of the invention would allow the door phone controller to accept voice prompts once the door speaker push-button was pressed. The voice prompts could enable and disable certain features in the door phone controller, including the door ajar mechanism. The door phone controller would respond only to pre-programmed voices and would thus reject all others.

Another embodiment allows the door phone controller to be programmed at the door itself via a keypad that could either be built into the speaker housing from a user detachable plug in a control device. A security code or other method of access control/verification would have to be entered before any programming could be accepted by the door phone controller.

The door phone controller of the present invention can be configured to serve multiple doors. Each door is provided with its own set of door ajar contacts to signal the door phone controller about the state of the door, i.e. opened or closed. In the event that a person outside of the building at one door is in conversation with the user and another door is left ajar, the door phone controller sends door-waiting tones to the user to indicate that the door was left ajar. The number of tones sent indicates which door was left open. Alternatively, different types of tones or signals could be sent to indicate which door was left open.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A system for alerting a user when a predetermined condition exists, comprising:
   a host telephone having an on/off-hook indicator and an alert device;
   a controller coupled to the host telephone;
   an indicator circuit providing an indicator signal to the controller when the predetermined condition exists;
   means for timing a preset time duration when the predetermined condition exists, said timing means providing a time-out signal when the preset time duration elapses;
   means for operating the controller to signal the host telephone when the time-out signal is provided in order to activate the alert device for a first preset alert duration;
   means for providing a warning signal to the host telephone when the on/off indicator indicates an off-hook condition of the host telephone; and
   means for stopping the warning signal via a stop signal input to the controller through the host telephone;
   wherein an on-hook signal from the on/off-hook indicator also operates the means for stopping the warning signal; and
   wherein the indicator circuit is a door ajar indicator switch and the predetermined condition is a door ajar condition.

2. A system according to claim 1, wherein the stop signal is a dual tone multi-frequency signal input through the host telephone to the controller.

3. A system according to claim 1, further comprising:
   means for operating the controller to re-signal the host telephone to again activate the alert device when the first preset alert duration expires if an off-hook signal was not detected.

4. A system according to claim 3, further comprising means for reactivating the timing means after an on-hook/off-hook transition was detected if the predetermined condition still exists.

5. A system according to claim 1, further comprising a door speaker push-button;
   wherein said controller accepts voice signals when the push-button is activated, said voice signals enabling and disabling features of the controller.

6. A system according to claim 1, further comprising a keypad located at a door, said keypad being operable to program said controller when an access code is entered by the user.

7. A system according to claim 1, further comprising:
   a plurality of door ajar indicator switches coupled to the controller; and
   means for sending a second warning signal to the host telephone when another indicator switch provides another indicator signal and the on/off-hook indicator indicates an off-hook condition of the host telephone.

8. In a system including a controller, an indicator switch, and a host telephone having an on/off-hook indicator and a ringer, a method for alerting a user that the indicator switch indicates a status condition, the method comprising the steps of:
   starting a timer when the status condition occurs and providing a time-out signal when said timer elapses;
   operating the controller to call the host telephone when the time-out signal is generated to enable the ringer for a pre-set ring duration;

providing a status tone to said host telephone when the on/off-hook indicator indicates an off-hook condition of the host telephone;

stopping the status tone when a stop signal is input through the host telephone or the on/off-hook indicator indicates an on-hook condition; and stopping the ringer via the controller when the pre-set ring duration expires if the on/off-hook indicator does not indicate an off-hook condition;

wherein said indicator switch is a door ajar indicator switch and the status condition is a door open condition.

9. A method according to claim 8, wherein the step of stopping the status tone includes the step of inputting a dual tone multi-frequency signal through the host telephone to the controller.

10. A method according to claim 8, further including a user chime wherein said step of operating the controller includes the step of activating the user chime for the pre-set ring duration.

11. A method according to claim 8, wherein a plurality of indicator switches are coupled to the controller for providing a plurality of status conditions, the method comprising the further steps of:

sending a second status tone to said host telephone when the on/off-hook indicator indicates an off-hook condition and another indicator switch indicates another status condition.

12. A method according to claim 11, wherein the step of sending a second status tone includes the step of sending an indicator switch specific signal to the host telephone system to indicate which indicator switch provided the second status tone.

13. In a system including a controller, a host telephone, and a status indicator, a method for alerting a user when the status indicator provides a first status signal, the method comprising the steps of:

(a) calling the host telephone via the controller to begin an for a pre-set alert duration time period when the first status signal is present;

(b) repeating step (a) if an off-hook condition of the host telephone is detected within the pre-set alert duration time period;

(c) sending a warning signal to the host telephone if the first status signal is present when the off-hook condition is detected;

(d) stopping the warning signal via a user generated stop signal sent to the controller via the host telephone; and (e) detecting an on-hook condition of the host telephone after the off-hook condition was detected and further including the step of repeating steps (a)-(e) if the first status signal is still present;

wherein said status indicator is a door ajar indicator switch and the first status signal indicates a door was left ajar.

14. A method according to claim 13, wherein said alert signal is at least one of a ring voltage signal for the host telephone and a user chime signal.

15. A method according to claim 14, wherein the step of stopping the warning signal includes the step of inputting a dual tone multi-frequency signal through the host telephone.

16. A method according to claim 13, wherein a plurality of indicator switches are coupled to the controller for providing a plurality of status conditions, the method comprising the further steps of:

sending a second status tone to said host telephone when the on/off-hook indicator indicates an off-hook condition and another indicator switch indicates another status condition.

17. A method according to claim 16, wherein the step of sending a second status tone includes the step of sending an indicator switch specific signal to the host telephone to indicate which indicator switch provided the second status tone.

* * * * *